US008751469B2

(12) United States Patent
Dittrich (10) Patent No.: US 8,751,469 B2
(45) Date of Patent: Jun. 10, 2014

(54) SYSTEM AND METHOD FOR SCALING FOR A LARGE NUMBER OF CONCURRENT USERS

(75) Inventor: Wolfgang Dittrich, Heidelberg (DE)

(73) Assignee: SAP AG, Walldorf (DE)

( * ) Notice: Subject to any disclaimer, the term of this patent is extended or adjusted under 35 U.S.C. 154(b) by 173 days.

(21) Appl. No.: 13/335,100

(22) Filed: Dec. 22, 2011

(65) Prior Publication Data

US 2012/0166525 A1 Jun. 28, 2012

Related U.S. Application Data

(63) Continuation-in-part of application No. 12/976,175, filed on Dec. 22, 2010.

(30) Foreign Application Priority Data

Dec. 20, 2011 (EP) .................................... 11194610

(51) Int. Cl.
*G06F 17/30* (2006.01)

(52) U.S. Cl.
USPC .................................... 707/704; 707/999.008

(58) Field of Classification Search
USPC .......................................... 707/704, 999.008
See application file for complete search history.

(56) References Cited

U.S. PATENT DOCUMENTS

| 5,699,500 | A | 12/1997 | Dasgupta | |
|---|---|---|---|---|
| 7,363,539 | B1 * | 4/2008 | Mitrov | 714/18 |
| 2003/0182285 | A1 * | 9/2003 | Kuwata et al. | 707/8 |
| 2003/0225891 | A1 * | 12/2003 | Stienhans | 709/227 |
| 2007/0101008 | A1 * | 5/2007 | Gomez | 709/228 |
| 2008/0059639 | A1 * | 3/2008 | Zhang | 709/227 |
| 2009/0249310 | A1 * | 10/2009 | Meijer et al. | 717/136 |
| 2011/0040826 | A1 * | 2/2011 | Chadzelek et al. | 709/203 |

OTHER PUBLICATIONS

Manual entitled "Web Programming with the SAP Web Application Server", dated May 2005.*
Article entitled "Web Programming with the SAP Web Application Server" by Heinemann et al., Copyright 2003.*
Brantner, M. et al., "Building a database in the cloud", Internet citation, Oct. 16, 2009, XP002649174, pp. 1-49.
Song, Xiang et al., "State management in web services", Distributed Computing Systems, May 26, 2004, Proceedings, FTDCS 2004, 10th IEEE International Workshop on Future Trends of Suzhou, China, pp. 21-27.
EP Search Report for application No. 11194610.9, dated Jun. 19, 2012.

* cited by examiner

*Primary Examiner* — Mahesh Dwivedi
(74) *Attorney, Agent, or Firm* — Kenyon & Kenyon LLP (57) ABSTRACT

A computer-implemented method for providing a stateful computer application to a multitude of users. The method may comprise generating a session identification (e.g., a primary key) for a user session for one user and retrieving a state representation using the session identification. The state of the stateful computer application may be described by a set of user-specific session variables that may be reconstructed from information contained in the state representation. The method may further comprise restoring the set of user-specific session variables using the retrieved state representation and calling functional computing logic based thereon. The functional computing logic may comprise the code of the stateful computer application and the call may provide an updated set of user-specific session variables. Upon completion of functions performed by the called functional computing logic, an updated state representation may be assembled from the updated set of user-specific session variables and stored.

15 Claims, 5 Drawing Sheets

SYSTEM AND METHOD FOR SCALING FOR A LARGE NUMBER OF CONCURRENT USERS

CROSS-REFERENCE TO RELATED APPLICATIONS

This application is a continuation-in-part of U.S. application Ser. No. 12/976,175, filed Dec. 22, 2010 (pending), and also claims priority to the European Patent Application No. 11 194 610.9, filed Dec. 20, 2011, the contents of both applications are incorporated herein by reference.

BACKGROUND

The present invention relates to a system and method for providing a stateful computer application to a multitude of users, as well as a computer program product.

Certain computer applications, such as SAP® ABAP™ applications, are "stateful" applications in which a state of a user session is maintained as a collection of user-specific session variables in main memory of the application server. The set of user-specific session variables may even be unique to the specific session. Stateful applications are efficient and provide excellent performance when there are a known, or at least predictable, number of concurrent users allowing appropriate HW sizing. In those situations, stateful applications handle in particular very high frequent requests of relatively short duration which might even operate on very large sessions with great efficiency. However, in environments such as cloud computing and software-as-a-service, where the number of concurrent users can range from a few to many, and is typically an unknown quantity, stateful applications may not provide the same efficiency and may lack performance due to the memory constraints. Also, the user sessions in cloud computing and software-as-a-service provided activities may typically experience rather infrequent requests (i.e. long think times), so the user session reserves unutilized computing resources for a longer period of time, which can contribute to the congestion and inefficient use of computing and memory resources.

Computer applications that are "stateless" are better suited for use in the cloud computing and software-as-a-service environment. A stateless application is a computer application that does not allocate dedicated main memory of the application server for maintaining the state of a user session (in between user requests), but rather uses external storage, such as a database, to maintain the state of a user session in a persistent memory. It would be beneficial if stateful applications could be transformed into stateless applications to take advantage of a "cloud computing" environment.

SUMMARY

The present invention provides for a method for providing a stateful computer application to a multitude of users, a system for providing a stateful computer application to a multitude of users and a computer program product.

The invention is described by the independent claims. Preferred embodiments are described in the dependent claims.

The invention relates to a method for providing a stateful computer application to a multitude of users, the method comprising for a given user of the plurality of users:

generating a session identification for a user session for the user, wherein the state of the stateful computer application is described by a set of user-specific session variables;

retrieving a state representation related to the user from a storage using the session identification, wherein the state representation comprises information permitting to reconstruct the set of user-specific session variables;

restoring the set of user-specific session variables for the user by using the retrieved state representation;

calling functional computing logic based on the restored set of user-specific session variables, wherein the functional computing logic comprises the code of the stateful computer application, wherein the call provides an updated set of user-specific session variables;

upon completion of functions performed by the called functional computing logic, assembling from the updated set of user-specific session variables an updated state representation for the user and storing the updated state representation in the storage, wherein the session identification is a primary key, wherein the updated state representation comprises information permitting to reconstruct the updated set of user-specific session variables.

Embodiments of the invention may have the advantage that a stateful application may be run on a stateless server system or may be run on a stateful server system but behaving like a stateless application. Embodiments may take existing stateful applications, for example web-based applications such as ABAP applications, and transform them into a stateless application. Thus, the advantages of stateful applications can be combined with the advantages of stateless applications. The present invention permits to transform the stateful application into a stateless application. This can be generally done by applying a combination of techniques, such as stateless consistency handling, and manual state management pattern, to web applications and batch jobs, respectively. To the user of the application, the application still appears to be stateful, whereas internally the stateful application is transformed and benefits the combined advantages of a stateful and stateless application.

Since a state representation is used, the amount of data which needs to be stored is kept at a minimum level. Based on the session identification, for a given user session the respective state representation can be obtained from a storage. The state representation comprises information permitting to reconstruct a set of user-specific session variables. These variables may comprise any variables which were used in the respective session. Thus, reconstructing these variables can be illustrated as resuming the execution of a session of a stateful application which was suspended for a period of time in a highly efficient and flexible manner.

It has to be noted that typically, the nature of a stateful application is that all variables necessary to maintain a session of this application need to be kept in a memory system of the stateful application, whereas a stateless computer system does not permit to maintain the state of a session in a main memory. Thus, the general architectures of these two concepts are strongly different. Nevertheless, the above described method may permit to combine the advantages of stateless and stateful applications: resources on the stateful server may be blocked or reserved only while the request is actually processed. After the request processing is finished (i.e. a response is sent to the client), all resources in particular the user context (i.e. the system variables and application variables incl. global and static variables) are freed and/or returned for reuse with other requests.

In accordance with an embodiment of the invention, retrieving the state representation comprises retrieving a cookie related to the user from the storage using the session identification, wherein the state representation is comprised in the cookie. For example, server side cookies are used to store the state representation. Cookie storage is particularly advantageous since any existing web-server session identification techniques can be used in order to implement the invention. Thus, this simplifies the implementation process.

In accordance with an embodiment of the invention, the stateful computer application is an application of a set of stateful computer applications, wherein the generation of the session identification is performed specific to the stateful computer applications of the set of stateful computer applications.

In accordance with an embodiment of the invention, the method further comprises providing a result of the calling by a user interface to the user.

In accordance with an embodiment of the invention, the functions performed by the functional computing logic are performed by a stateful computer system. For example, the session identification is generated by the stateful computer application and the restoring of the set of user-specific session variables is performed by the stateful computer system.

The implementation of the above described method may either be done by modifying the coding of the stateful application, i.e. a transformation of the stateful application into an application behaving like a stateless application. Or the stateful application can be maintained, while the application server is modified. The first approach does not require changes to the stateful server (kernel etc.) whereas the second one does. The advantage of the second approach is that it minimizes the number of necessary stateful application modifications compared with the first approach. The first approach does not require server changes but depends on new framework modules as addon.

In accordance with an embodiment of the invention, the method further comprises transforming the stateful application into a transformed application by a recoding process, wherein the transformed application is able to perform the method. This is the first approach.

In accordance with an embodiment of the invention, the functional computing logic comprises the code of the stateful computer application in an unmodified manner. This is the second approach.

Herein, recoding can be understood as for example exchanging individual statements in the original coding of the stateful application by statements which make the stateful application behaving stateless. An example is given below with respect to the substitution of locking functions by the stateless locking framework module. Another example is given below with respect to the stateless update task framework.

It has to be noted, that these frameworks can either be implemented using a recoding process of the stateful application or by providing addons (i.e. modules) to the server which interpret the original coding of the stateful application in such a manner that as a result the behavior when executed is the behavior of a stateless application. While the first approach requires modification of the code, the second approach requires modification of the server, for example its firmware.

In accordance with an embodiment of the invention, the stateful computer system comprises a stateless locking framework module, wherein in case the calling of the functional computing logic comprises calling of locking functions of the stateful computer application, the stateless locking framework module substitutes the locking functions of the stateful computer application by substitute locking functions, wherein the substitute locking functions are adapted for providing database locks on data resources requested by the calling of the functional computing logic. Thus, in the second approach, the stateless locking framework module may be provided which enables to implement a stateless-like locking behavior with the stateful application. This 'upgrades' the stateful computer system which is normally not able to implement the stateless-like locking behavior.

In accordance with an embodiment of the invention, the data resources are comprised in an application database.

In accordance with an embodiment of the invention, the database locks are stored in a lock storage database, wherein the database locks are stored associated with the session identification, the name of the computer running the stateful computer application and a timestamp as a compound primary key, wherein the timestamp comprises the point in time when the respective database lock was set. This may have the advantage, that lock tracking can be ensured at high accuracy. Typically, the session identification is not a globally unique ID. However, by combining the session ID with the name of the computer running the stateful computer application and a timestamp as a compound primary key, the uniqueness of the key can be guaranteed. Further, the timestamp may be used as an additional diversifying element which ensures uniqueness of the key.

In accordance with an embodiment of the invention, the stateful computer system comprises a stateless update task framework module, wherein the stateless update task framework module is queuing predetermined statements of the code of the stateful computer application, wherein the queued statements are executed upon reception of a predefined execution statement, wherein the queuing is performed in a database table, wherein the database table is maintainable over the whole user session. Thus, even though a queuing of statements may not be provided for stateless applications, nevertheless the stateful application which now behaves like a stateless application is able to use the queuing feature.

In accordance with an embodiment of the invention, the stateful computer system comprises a clean-up job module, wherein the clean-up job module is removing the database locks on data resources previously set by the stateless locking framework module, wherein the removal of the database locks is performed after a timeout, wherein the timeout is determined for each database lock from a predetermined time period and the timestamp. Preferably, the clean-up job module regularly checks for the locks on the data resources. This can be done in regular time intervals. In case the lock was already maintained for a longer period of time than a maximum predefined time interval calculated from predetermined time period and the timestamp of the lock, the lock is released. Also, any existing state representation related to the user, session and computer system may be deleted. This permits to clean-up the system. The number of active locks and state representations is minimized thus further increasing the number of users which can be potentially served with the computer system.

In another aspect, the invention relates to a computer program product comprising computer executable instructions to perform the above described method.

In another aspect, the invention relates to a computer system for providing a stateful computer application to a multitude of users, the system being adapted for performing the following steps for a given user of the plurality of users:
    generating a session identification for a user session for the user, wherein the state of the stateful computer application is described by a set of user-specific session variables;
    retrieving a state representation related to the user from a storage using the session identification, wherein the state representation comprises information permitting to reconstruct the set of user-specific session variables;

restoring the set of user-specific session variables for the user by using the retrieved state representation;

calling functional computing logic based on the restored set of user-specific session variables, wherein the functional computing logic comprises the code of the stateful computer application, wherein the call provides an updated set of user-specific session variables;

upon completion of functions performed by the called functional computing logic, assembling from the updated set of user-specific session variables an updated state representation for the user and storing the updated state representation in the storage, wherein the session identification is a primary key, wherein the updated state representation comprises information permitting to reconstruct the updated set of user-specific session variables.

In another aspect, the invention relates to A method for transforming a stateful computer application to a stateless application to facilitate scaling to a large number of concurrent users of the computer system, comprising:

generating, by a processor executing a computer application, a session identification for a user session for each user of a plurality of users of the computer application;

retrieving cookies related to the user from the plurality of users from an external storage using the session identification;

restoring, by the processor, a user context for the user from the plurality of users of the computer application by using the retrieved cookies;

calling functional computing logic based on the restored user context;

assembling a state representation subset of the user context according to data in a database;

upon completion of functions performed by the computer application functional computing logic, storing the user context and the assembled state representation as a cookie for each of the plurality of users in external storage, wherein the session ID is a primary key; and generating HTML code by a user interface for the user based on the assembled state representation, user context, and data from the accessed database.

In accordance with an embodiment of the invention, the method further comprises generating a new session identification for each of a plurality of users of a different computer application while the previous session identification remains active.

In accordance with an embodiment of the invention, the session identification is generated by a stateful computer application, and the user context is restored by a stateless computer application.

In accordance with an embodiment of the invention, the stateless computer application is a business page server (BSP) application.

In another aspect, the invention relates to a computer system for transforming a stateful computer application to a stateless application to facilitate scaling a computer system to a large number of concurrent users, comprising a terminal for receiving inputs and outputting data; a database for storing data; and an application server having a processor configured to:

generate a session identification for a user session of each of a plurality of users of the computer application;

retrieve cookies related to each of the plurality the user from external storage using the session identification;

restore a user context for each of the plurality of users of the computer application by using the retrieved cookies;

call functional computing logic based on the restored user context;

assemble a state representation subset of the user context according to data in a database;

upon completion of functions performed by the functional computing logic, store the user context and the assembled state representation as a cookie for each of the plurality of users in external storage, wherein the session ID is a primary key; and generate HTML code by a user interface based on the assembled state representation, user context, and data from the accessed database.

In accordance with an embodiment of the invention, the processor is further configured to generate a new session identification for each of a plurality of users of a different computer application having different functional computing logic while the previous session identification remains active.

In accordance with an embodiment of the invention, the session identification is generated by a stateful computer application, and the user context is restored by a stateless computer application.

In accordance with an embodiment of the invention, the stateless computer application is a business page server application.

In another aspect, the invention relates to a machine-readable storage medium embodied with program instructions for causing a computer processor to execute a method for scaling a computer system to a large number of concurrent users, the method comprising:

generating a session identification for a user session of each of a plurality of users of the computer application;

retrieving cookies related to each of the plurality the user from external storage using the session identification;

restoring a user context for each of the plurality of users of the computer application by using the retrieved cookies;

calling functional computing logic based on the restored user context;

assembling a state representation subset of the user context according to data in a database;

upon completion of functions performed by the functional computing logic, storing the user context and the assembled state representation as a cookie for each of the plurality of users in external storage, wherein the session ID is a primary key; and generating HTML code by a user interface for each of the plurality of based on the assembled state representation, user context, and data from the accessed database.

In accordance with an embodiment of the invention, the method further comprises generating a new session identification for each of a plurality of users of a different computer application having different functional computing logic while the previous session identification remains active.

In accordance with an embodiment of the invention, the session identification is generated by a stateful computer application, and the user context is restored by a stateless computer application.

In accordance with an embodiment of the invention, the stateless computer application is a business page server application executing on a processor.

In another aspect, the invention relates to a method for substituting a stateless implementation for a stateful implementation to provide further functionality to scale a computer application for use by a large number of users, comprising:

generating a computer session identification in response a request for a computer application, the computer session identification including information related to the computer requesting the computer application;

forming a user context from the information related to the requesting computer;

creating a cookie having a state representation of the user context and the computer session identification;

accessing data from a database for execution of the computer application functions;

upon execution of functions related to the computer application, assembling a revised state representation of the user context including the computer session;

upon completion of functions performed by the computer application, revising the cookie to include the assembled state representation, wherein the session ID is a primary key for retrieving the cookie from external storage;

storing the revised cookie in external storage; and generating HTML code by a user interface based on the assembled state representation, user context, and data from the accessed database.

In another aspect, the invention relates to a system for substituting a stateless implementation for a stateful implementation to provide further functionality to scale a computer application for use by a large number of users, comprising a terminal for receiving inputs and outputting data; a database for storing data; and an application server having a processor configured to:

generate a computer session identification in response a request for a computer application, the computer session identification including information related to the computer requesting the computer application;

form a user context from the information related to the requesting computer;

create a cookie having a state representation of the user context and the computer session identification;

access data from a database for execution of the computer application functions;

upon execution of functions related to the computer application, assemble a revised state representation of the user context including the computer session;

upon completion of functions performed by the computer application, revise the cookie to include the assembled state representation, wherein the session ID is a primary key for retrieving the cookie from external storage;

store the revised cookie in external storage; and generate HTML code by a user interface based on the assembled state representation, user context, and data from the accessed database.

In another aspect, the invention relates to a machine-readable storage medium embodied with program instructions for causing a computer processor to execute a method for scaling a computer system to a large number of concurrent users, the method comprising:

generating a computer session identification in response a request for a computer application, the computer session identification including information related to the computer requesting the computer application;

forming a user context from the information related to the requesting computer;

creating a cookie having a state representation of the user context and the computer session identification;

accessing data from a database for execution of the computer application functions;

upon execution of functions related to the computer application, assembling a revised state representation of the user context including the computer session;

upon completion of functions performed by the computer application, revising the cookie to include the assembled state representation, wherein the session ID is a primary key for retrieving the cookie from external storage;

storing the revised cookie in external storage; and generating HTML code by a user interface based on the assembled state representation, user context, and data from the accessed database.

Thus, the disclosed subject matter relates to a system and method for scaling of a computer system of limited hardware resources from a small number of concurrent users to a large number of concurrent users. In an embodiment, the disclosed subject matter relates to a software architecture for scaling to a large number of concurrent users using limited hardware resources by transforming the state management and consistency handling of traditional computer programs, such as ABAP™ programs.

BRIEF DESCRIPTION OF THE DRAWINGS

The enclosed drawings disclose preferred embodiments of the invention. It should be understood, however, that the drawings are designed for the purpose of illustration only and not as a definition of the limits of the invention. In the drawings.

DETAILED DESCRIPTION

Embodiments may take existing stateful web-based applications, such as ABAP applications, and transform them into a stateless application by applying a combination of techniques, such as stateless consistency handling, and manual state management pattern, to web applications and batch jobs, respectively.

Described herein are embodiments of a system, a machine-readable storage medium, and a method for transforming a stateful computer application to a stateless application so a large number of concurrent users may use limited hardware resources. In an exemplary method, a processor may generate a session identification for a user session of each of a plurality of users of the computer application. Cookies related to each of the plurality of users may be retrieved from external storage using the session identification (ID). A user context may be restored for each of the plurality of users of the computer application by using the retrieved cookies. The user context may be the "main memory content" that the application uses to process a request, and includes local data structures, user input, caches, and perhaps related database information. Functional computing logic, may be called based on the restored user context. A state representation subset of the user context may be assembled afterwards. The state representation may be the portions of the user context that are sufficient to recreate the full user context. The state representative may be understood as a compressed version of the user context.

For example, the "user context"—of for example ABAP applications—is made up out of system variables and application variables (e.g. global and static variables). A "state representation" is a subset of the user context which is sufficient to rebuild the user context.

Upon completion of functions performed by the called functional computing logic, the assembled state representation may be stored as a cookie for each of the plurality of users in external storage, in which case, the session ID may be a primary key. Based on the user context, and data from the accessed database, HTML code may be generated by a user interface layer.

Embodiments may provide a system that may include a user terminal, a database, and an application server. The user terminal may receive inputs and output data. The database may store data. The application server may have a processor configured to generate a session identification for a user session of each of a plurality of users of the computer application. The processor may retrieve cookies related to each of the plurality of users from external storage using the session identification. A user context for each of the plurality of users of the computer application may be restored by using the retrieved cookies. Functional computing logic may be called based on the restored user context. A state representation subset of the user context may be assembled by the processor. Upon completion of functions performed by a processor according to the called functional computing logic, the assembled state representation may be stored as a cookie for each of the plurality of users in external storage. When storing the assembled state representation, the session ID may be a primary key. Based on the user context, and data from the accessed database, HTML code may be generated by a user interface.

Also, described embodiments provide a machine-readable storage medium embodying computer program instructions for implementing a method for transforming a stateful computer application to a stateless application so a large number of concurrent users may use limited hardware resources.

Terms used in the disclosure include: "State storage" that may refer to persistent storage that holds the server side cookies; an "application database" that may refer to the database (DB) used as persistence storage of the application; a "user context", such as in ABAP applications, may include system variables and application variables (e.g. global and static variables); a "state representation" may be a subset of the full user context that is sufficient to rebuild the user context; and a "dialog step" may be a single request by the system to a user. It should be understood that the claimed embodiments may refer to any stateful application executing on a stateful server, but, for ease of explanation, reference to a specific example of an ABAP application executing on a server, such as an ABAP server, may be made. Other examples include two tier applications which may be converted into Rich Internet Application (RIA) internet applications by separating UI from computation logic tier so that the UI tier runs in the browser and the computation logic tier runs on the application server. These applications may employ programming environments like Microsoft .Net and Java. Functional computing logic may be executed by a processor to provide a specific operator on data and may encompass any number of processes, such as invoicing, accounting, human resources and the like.

A stateless pattern may refer to stateless request processing performed on a server, such as an stateful ABAP server. Stateless request processing may occur when a computer application that does not allocate main memory, but rather may use external storage, such as a database, to maintain the state of the user session in persistent memory in between dialog steps. In addition, the term "stateless" may mean that resources on the server are blocked or reserved only while the request is actually processed. After the server finishes the request processing (i.e. a response is sent to the client), all resources, in particular, the user context may be freed or returned for reuse with other requests.

Figure 1:
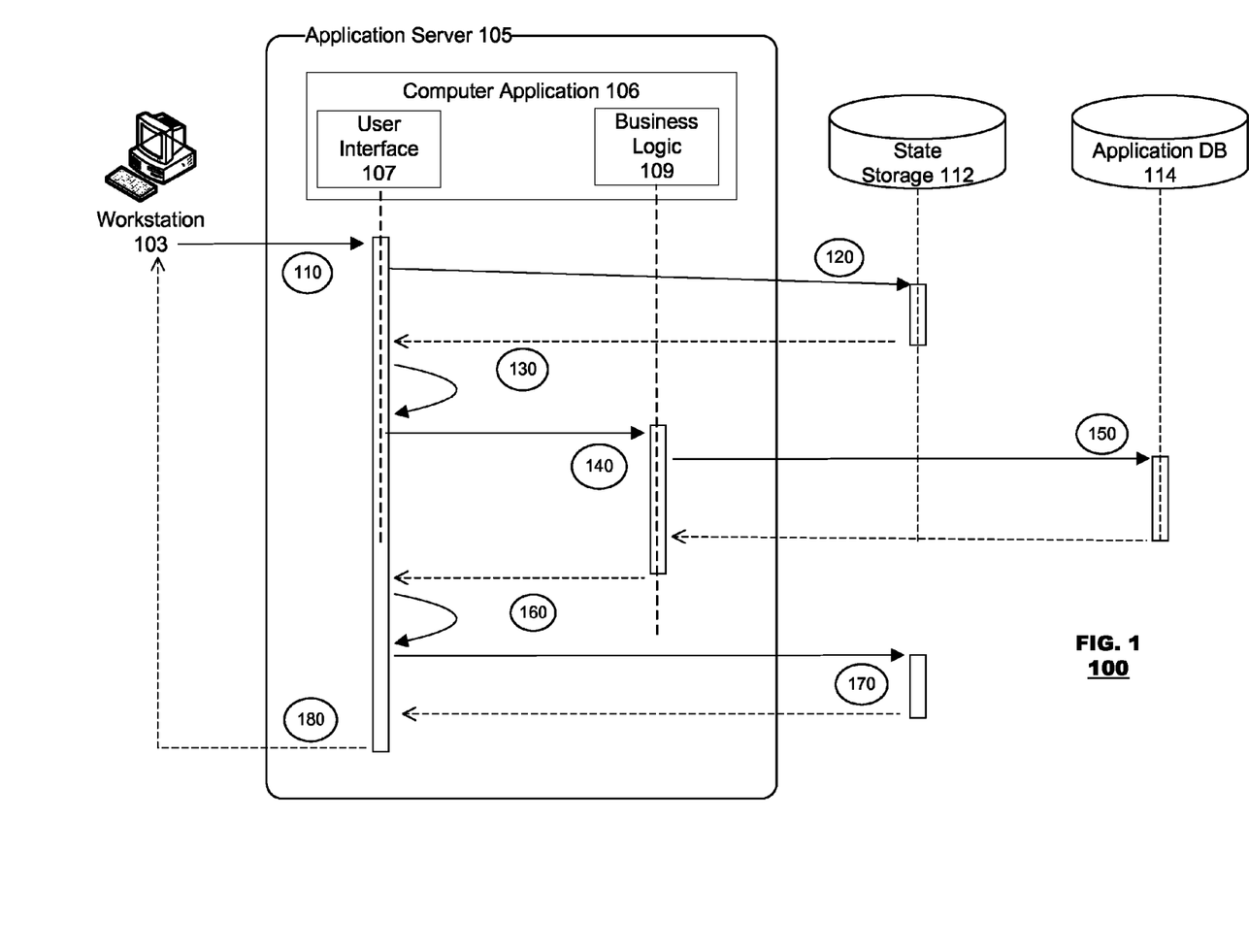
FIG. 1 illustrates an exemplary stateless pattern for transforming stateful computer applications to stateless computer applications according to an exemplary embodiment.

FIG. 1 illustrates an exemplary application of a stateless pattern for transforming stateful computer applications to stateless computer applications according to an exemplary embodiment. Throughout this disclosure the term 'transforming' has to be understood as 'behaving' or 'acting like'. Thus, in the present embodiment of FIG. 1, the stateful application is executed on a stateful server 105, wherein the execution is performed in such a manner that to the workstation 103 the application behaves like an ordinary stateless application. This permits to overcome deficiencies with respect to scaling of the stateful applications. However, both the method for maintaining the user state and the method for consistency handling (e.g. Enqueue locks and update tasks) may require transformations to operate as a stateless application.

As illustrated in the stateless pattern of FIG. 1, different actions may take place to accomplish the transformations.

The working principle of the stateless pattern is illustrated in FIG. 1. The implementing computer system may include an application server 105, a state storage 112 and an application database (DB) 114. The application server 105 may include a computer application 106. The computer application 106 may include a user interface (UI) layer 107 and a functional computing logic layer 109. The user interface layer 107 may cause a graphical user interface to be presented on a workstation 103. The respective layers 107 and 109 may include modules containing software code executable by a processor in workstation 103. In the process 100 of FIG. 1, a request issued from a browser under control of a processor executing on a workstation 103 may be received by the UI layer 107 at step 110. The request may include data related to the user (e.g., password, logon ID, and the like). The functional computing logic layer 109 may be executable code related to a functional computer process such as invoicing, human resources management and/or the like. However, the functional computing logic layer log can be related to any suitable process, such as file management.

The process 100 may authenticate the user via the UI layer 107 executing on the computer processor, and generate a session ID. The session ID may be generated by a UI framework (e.g. the Business Server Pages (BSP) application framework) executing on the application server 105 and in combination with processing at the UI layer 107. The processor executing the UI layer 107, using the session ID, may retrieve at step 120 cookies associated with the data of the session ID from, for example, the state storage 112. The state storage 112 may be any data storage capable of storing the server side cookies and accessible by the processor. Since the user session ID may be a small amount of data and may be easily passed between functions within the application server 105, the user session ID may be used as a primary key when storing the cookie in state storage 112.

The processor may use the UI layer 107 to restore a user context (or state) from a state representation derived from the cookies. As mentioned above, the user context may be made up of system and application variables. Since system variables (SY variables) may not be set by the application directly, the components of the application (functional computing logic layer 109 or user interface layer 107) that may use the SY variable may be configured to utilize the respective SY variables on a case-by-case basis.

Furthermore, since most SY variables are only consumed during a single dialog session, the likelihood of errors related to them is rather low.

At step 130, based on the state representation stored in the retrieved cookie, the functionality of the UI layer 107 may cause the processor to restore the user context by setting all necessary static variables of the function modules, the global variables, and the like, related to the authenticated user. The functional computing logic 109 may be called at step 140 using the restored user context.

At step 150, the functional computing logic 109 may cause the processor to access the application database 114 and/or may set or release locks based on the data requested for use by the workstation 103. Locks may managed by a lock manager, e.g. the SAP Enqueue server.

The application database 114 may contain a lock storage, e.g. a database table, operated on by a lock manager that maintains the status of all locks for each session. After the functional computing logic 109 has completed retrieving data, at step 160, the functionality of UI layer 107 may cause the processor to assemble a state representation of the current user session.

After the state representation is assembled, at step 170, the user context may be stored as a cookie in the state storage 112. At step 180, the UI 107 may generate the HTML containing the data requested by the workstation 103 for rendering by the browser on the workstation 103. The UI 107 may use the restored user context when generating the HTML for rendering by the browser.

Transforming a stateful application into a stateless application may comprise to regroup the code structure such that it complies with the stateless pattern. Regrouping may require modification of the functional computing logic 109 and user interface 107 layer. In addition, new coding for steps 120, 130, 160 and 170 may be added to manage the state (by applying the state management pattern). As illustrated in FIG. 1, a computer application 106 may be conceptually split into a user interface 107 and functional computing logic 109. Manual state management may comprise two phases: phase 1 and phase 2. During phase 1 (comprising steps 110-140 of FIG. 1), the user context may be restored from a condensed state representation read from, for example, external state storage 112 such that the functional computing logic 109 can be called basically unchanged. During phase 2 (steps 160-170 of FIG. 1), the condensed state representation may be assembled using the user context and persisted (e.g. saved) on the external state storage 112. The session ID may be used to identify the state representation on the external storage 112 in both cases.

Figure 2A:
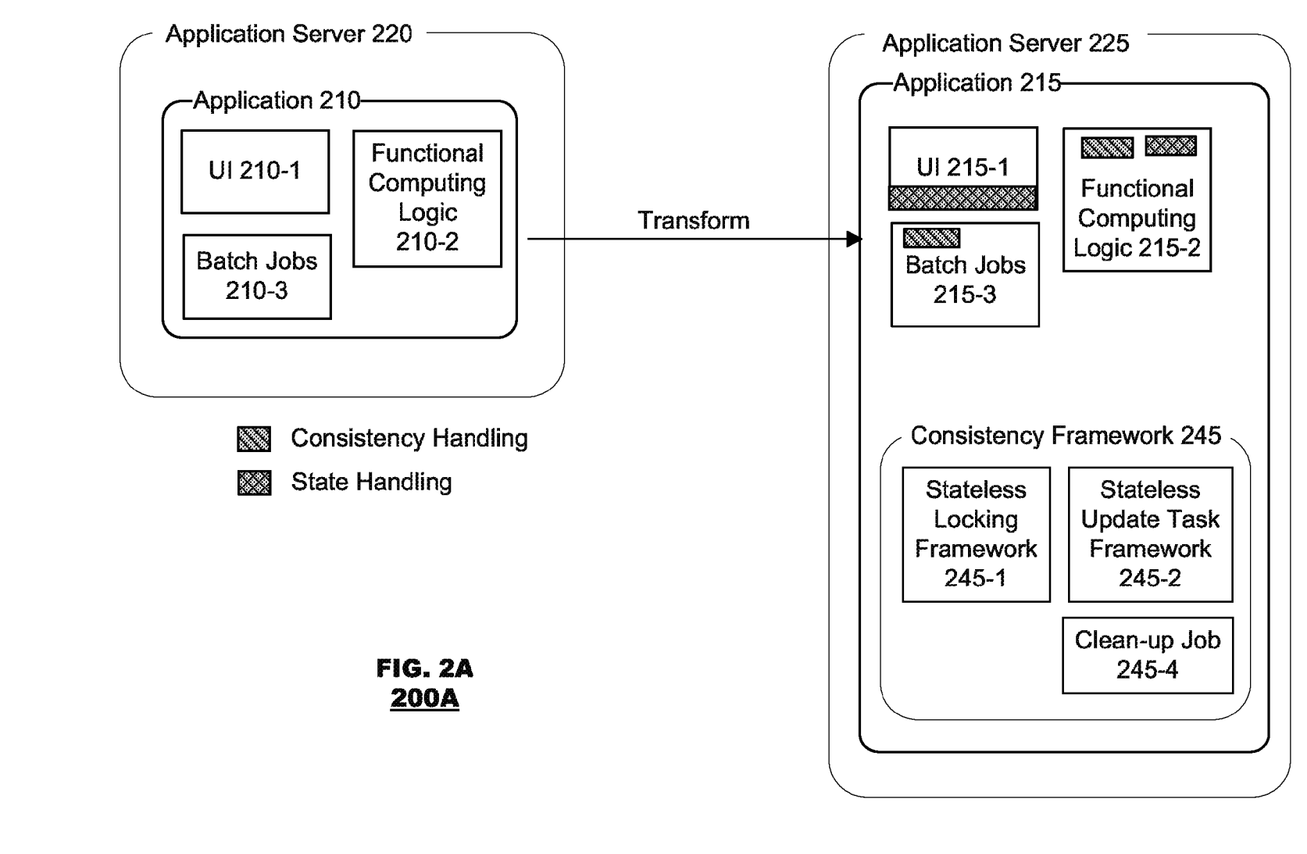
FIGS. 2A and 2B illustrate exemplary component diagrams of software frameworks in an application environment and a server environment, respectively, for scaling a computer system to a large number of concurrent users according to an exemplary embodiment.

As described above, changes to a stateful server instead of modifications of the stateful application code may be used. FIG. 2A. FIG. 2A illustrates an exemplary component diagram of a software framework in an application environment for scaling a computer system to a large number of concurrent users according to an exemplary embodiment. The stateful computer application 210 executing on a computer processor may include two software layers: a user interface (UI) layer 210-1 and a functional computing logic (FL) layer 210-2. The computer application 210 may also generate batch jobs 210-3. The UI layer 210-1 may generate HTML pages which may be rendered (directly or indirectly using, for example, a plug-in) by a browser on a client. The HTML pages may be created based on a server-side programming model within the framework of a stateless computer application 210, such as a business server pages (BSP) application framework.

The computer application 210 may be a stateful application that may include the following components: pages, page fragments, navigation structure, application class, MIME objects, a topic, and/or other features. A topic may be a predefined content category used for classifying and targeting content, and for user subscription. Stateless business server pages may also process HTTP requests in a stateless fashion. The computer application 210 may generate a HTML page, and the HTML page in a specific example may also be considered a component of a business server page application. The generated HTML page may include a layout part, event handlers, as well as page attributes and type definitions. In some embodiments, the computer application 210 may be any form of web application that may utilize a HTTP request handler, such as CL_BSP_EXTENSION. For example, the web application may be a portal, an online shop, or the like.

The computer system of FIG. 2A may include, in a stateful condition, the application server 220, which may host computer application 210. However, when transformed to a stateless application 215, the transformed application 215 may include additional data and executable code. For example, the transformed application 215 may include a transformed user interface (UI) 215-1, transformed functional computing logic 215-2 and transformed batch job 215-3.

Furthermore, the stateful application server 220 may be modified running various modules or a so called 'consistency framework' 245 that may include a stateless locking framework or module 245-1 and stateless update task framework or module 245-2 in order to support the consistency handling of the transformed application. In addition, a clean up job module 245-4 may remove data of no longer active sessions from an external storage used by consistency frameworks and/or from the state storage, for example the data storage 112 of FIG. 1.

The UI 215-1 of the transformed application may be stateless, and may interact with a further application, such as a stateless BSP application. The UI 215-1 may also include additional functionality provided by additional executable code that provides state handling. The state of, for example, the BSP application belonging to the UI 215-1 may be included as part of the state representation as well. The batch jobs 215-3 of the transformed application 215 may also include additional functionality for maintaining consistency handling. Similarly, the functional computing logic 215-2 of the transformed application 215 may include additional functionality for both consistency handling and state handling.

In order to apply the state management pattern (which may apply to steps 120, 130, 160 and 170 of FIG. 1), manual changes to the to-be-transformed application 210 may be made. Additional coding in order to retrieve the state representation (phase 2) and recreate the context from the state representation (phase 1) may be added to obtain the functional computing logic 215-2. This coding is then called (e.g., during steps 130 and 160 of FIG. 1) to retrieve and set the context, respectively. For example, methods to serialize the internal state of an object plus special constructors to recreate those objects from the serialized data may be added to classes and/or functional groups so function modules may retrieve/set the state of function groups (i.e., variables with scope function group). In the transformed application 215, only minor modifications may be needed to the way the locks are handled, for example, at step 140. These modifications may be replacements of, for example, SAP Enqueue lock calls with calls to semantically compatible functions provided by the stateless locking framework.

The stateless locking framework 245-1 may provide substitutes for all existing functions, in particular the functions trying to set a lock (e.g., S_ENQUEUE instead of ENQUEUE provided by an SAP application server), remove a lock (e.g., S_DEQUEUE instead of DEQUEUE) and remove all locks of a giving session (e.g., S_DEQUEUE_ALL instead of DEQUEUE_ALL) may have substitutes. Each of the above functions—in addition to the parameters of the original function—may include the new parameter LUW_ID. A LUW is a logical unit of work, and may be active for the span of time during which any transaction is updated in an all-or-nothing manner. For example, the session ID may be used as the LUW_ID. The session ID can be retrieved from, for example, a BSP application executing on application server 215 using, for example, a RUNTIME object where (RUNTIME->session-id).

The implementation of the stateless locking framework may include a lock manager and a lock storage. The lock storage may be a database table with a compound primary key consisting of a computer name, a LUW_ID, and a timestamp. The timestamp may contain the point in time when the lock was set and the computer name and unique identification of the application server calling the stateless locking framework. With this data structure, all locks associated with a user session can be easily identified by means of the common LUW_ID. In addition locks may be selected based on time and by which computer they were set. The asynchronous behavior of the stateless locking framework 245-1 may be implemented, for example, by using asynchronous remote function calls.

In the transformed application 215, the manner in which update tasks are handled may be modified at step 140 of FIG. 1. Therefore, the stateless update task framework 245-2 may provide compatible substitutes for the following functions:

+CALL FUNCTION . . . IN UPDATE TASK—If a function module is called, for example, using this statement, the function module may be flagged for execution using a special update work process.

+PERFORM ON COMMIT—This statement may be used, for example, to call a subroutine in the dialog work process.

+CALL FUNCTION . . . IN BACKGROUND TASK DESTINATION—Function modules called using this statement may, for example, be registered for background execution in another system, such as an SAP system, when the program reaches the next COMMIT WORK statement (using, for example, a Remote Function Call).

+PERFORM ON COMMIT—This statement may, for example, call a subroutine in the dialog work process on COMMIT WORK.

+PERFORM ON ROLLBACK—This statement may call a subroutine in the dialog work process on ROLLBACK.

+SET UPDATE TASK LOCAL—This statement if called before any of the statements above may cause the execution of the statements at COMMIT WORK to be done by the current work process.

A general idea of the stateless update task framework may be, instead of executing the above statements directly, their execution may be deferred to a later point in time (which may be determined by the application 215 logic) by queuing the statements in a specific database table (the update task storage). It has to be noted, that queuing is normally not possible for stateless applications. Thus, the stateless update task framework provides functionalities which are normally not available for stateless applications.

The queued statements may be maintained in the update task storage, like a database table, for the entire user session, not just a single dialog step. The task of queuing and replaying these statements may be managed by the stateless update task framework 245-2. The point in time when the replay or cancel is triggered may be determined by executing a COMMIT WORK or ROLLBACK WORK statement within the application 215 logic. Specifically, instead of calling, for example CALL FUNCTION IN UPDATE TASK (and the other statements) directly, the stateless update task framework 245-2 may be called. The stateless update task framework 245-2 may store the name of the function and the value of all its parameters using the session key as the primary key in a persistent queue. In addition before each COMMIT WORK or ROLLBACK WORK statement, a call to the stateless update task framework 245-2 to replay or cancel the queued statements, respectively, may be inserted. Canceling the queued statements can be simplified by registering a subroutine with PERFORM ON COMMIT and PERFORM ON ROLLBACK before step 140 of the stateless pattern illustrated in FIG. 1. This subroutine may call the stateless update task framework 245-2 to trigger the appropriate action.

When, for example, a COMMIT WORK is called, the stateless update task framework 245-2 may retrieve all queued statements, and may execute them one by one. In case of a ROLLBACK WORK, memorized statements may be removed from the stateless update task framework 245-2 queue. In order to simplify the implementation of the framework queue and to avoid another background task clearing the database entries, data storage such as state storage 112 of FIG. 1 that stored the server side cookies may be used.

While doing the transformation, i.e. while carrying out the method outlined in FIG. 1 it may be checked whether the application context is restored appropriately such that the statements can execute in an expected context. Otherwise additional coding must be added to make sure the context is restored as needed.

When a new task is begun by a process, a statement, such as a CALL FUNCTION STARTING NEW TASK statement may be called. The statement CALL FUNCTION STARTING NEW TASK may only be indirectly affected by the stateless pattern. Only in the case in which callbacks are used may a code modification be required. For example, callbacks may not work after the dialog step in which the CALL FUNCTION STARTING NEW TASK is executed has ended. Hence the statement WAIT_UNTIL may be added before the end of the dialog step in the stateful application, in order to sync with the asynchronously called functions.

In a situation where two (or more) remote function calls to the same function module instance are to be executed in different dialog steps, and each of the different dialog steps expect stateful behavior on the receiving side, the application server 225 may have to address the remote function calls to insure proper execution of the remote function call. A technique similar to the one used for web applications may be used where the internal state of the called function module (or even function group) is serialized and stored using a server side cookie and retrieved again when the function module is called again. For example, the receiving side may call a stateless function or application remote from the transformed stateful application. In this case, the application server 225 has to ensure the proper execution of the remote function call. Still, a stateful application is provided to the receiving side like for example the workstation 103 of FIG. 1 while the internal processing is optimized with features of a stateless application The application 215 may perform background tasks by batch jobs 210-3 in FIG. 2A. A background task may for example be a task which is executed in the background until a final result is generated by the task. After the generation of the result, a user may be notified of the task completion. In order for background tasks to work smoothly (i.e. to avoid inconsistencies) with the transformed user interface 215-1 and related functional computing logic 215-2, the batch jobs 210-3 may need to be adjusted like the other parts to become batch jobs 215-3. In an example, a background task may have no session ID since it is not called directly by for example the workstation 103 of FIG. 1 in a session. The background task may haven been instantiated by a stateful application, wherein the stateful application itself was called by a user. Thus, since there may be no session ID for background tasks, an artificial session ID may be created. The artificial session ID may be created by generating a GUID (which is a unique ID) using, for example, a function GUID_CREATE for each task instance. Creating the GUID may be a work-around since there might be no easy way to retrieve the user context ID from within an ABAP program. In this context, the GUID may only be generated once, and may be used as the session ID. The GUID allows for consistency handling since it is unique to the session. All transformations may apply to the GUID during the session. This applies not only to batch jobs but also to remote function calls, function new task calls, a business application programming interface (BAPI), and the like. A BAPI may be an interface for providing access to processes and data in business application systems such as SAP R/3. As mentioned above, the GUID may be a combination of a session identification, the name of the computer running the stateful computer application and a timestamp.

An implementation within the stateful server may directly access the user context ID and does not depend on the work-around described above. The user context ID is used within the stateful server like the session ID for the UI. The kernel knows whether the coding runs as UI or background task hence it can pick the appropriate ID.

Since the stateless locking framework 245-1 is not integrated with an ABAP basis it may not be called in case the application may end (either normally or abnormally). Locks remain, for example, because of unforeseen aborts that may occur with computer application 215. Hence, a mechanism is needed to ensure that those locks managed by the stateless locking framework 245-1 are removed which are no longer valid. Similar issues exist for the storage of the stateless update task framework 245-2 and the state storage. A cleanup function 245-4 may check for inactive sessions (sessions that are no longer active but for which locks, update tasks or stored state representations still exist), and may remove invalid locks, update tasks and state representations belonging to session which no longer exist. A batch job running the clean-up function 245-4 may run repeatedly from time to time, e.g. every 15 minutes, and may remove all locks, update tasks and state representations for which no active session exists anymore.

In a specific example, the state information of an ABAP application, functioning as application 215, may include the following information: the user interface interaction state, which may include a current state of user interface controls; and a record of all user issued changes not yet committed to a database. The user issued changes may be stored in application specific data structures and variables. Any other data may be considered supporting data structure. A supporting data structure may for example comprise a search index generated from data resources requested by the calling of the functional computing logic of the stateful application. Particular cached data that may be held in the user context for performance reasons is not part of the user state. Instead, it may be re-read with every request. Any variable containing a copy or derived information may also not be part of the user state, and may also be re-read from the database or recomputed when necessary.

In one embodiment, only the state information as listed above need to be stored in state storage and all the supporting data structures are rebuild using the state information each time in phase 1. However, depending on the time required to build up the supporting data structures it may be beneficial to include some or all of the supporting data in the user state. The trade-off of how much of the state information is needed or should be stored may be determined for each application.

Figure 2B:
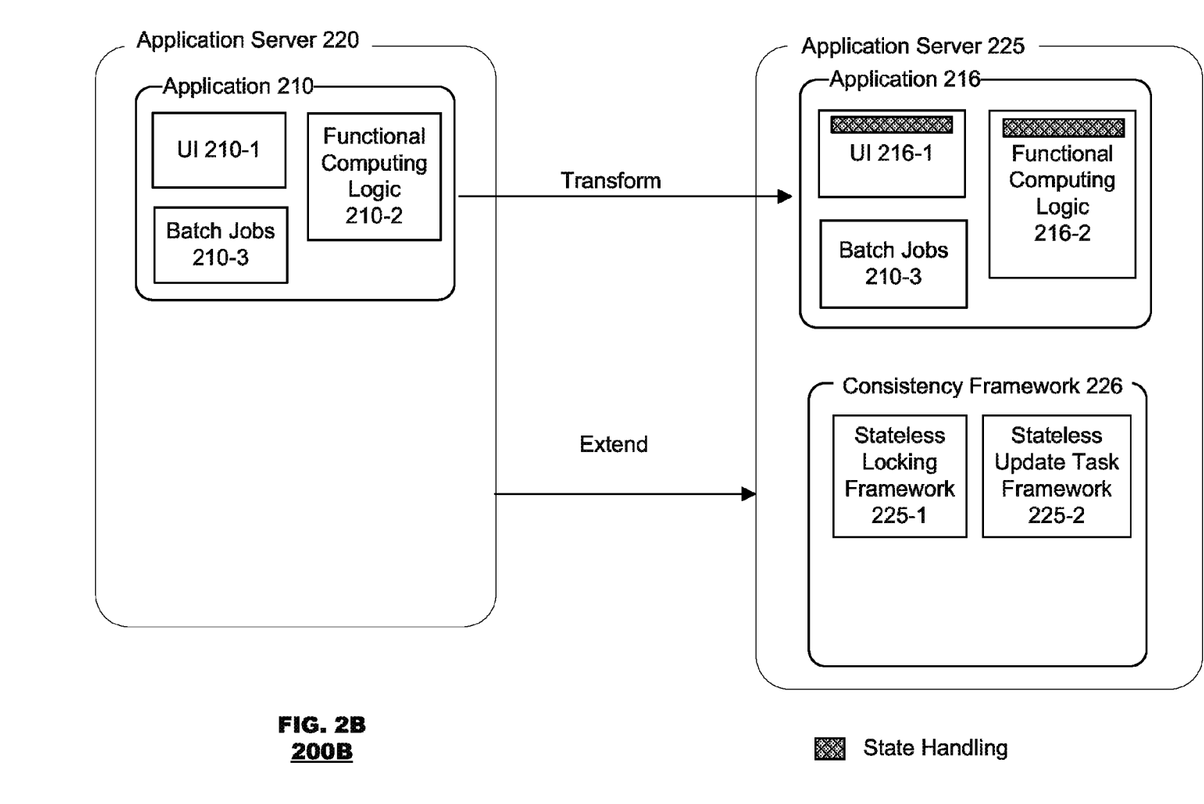

FIG. 2B illustrates an exemplary component diagram of a software framework in a server environment for scaling a computer system to a large number of concurrent users according to an exemplary embodiment.

The computer system of FIG. 2B may include, in a stateful condition, the application server 220, which may host computer application 210. Thus, the server 220 is a stateful server and the application 210 is a stateful application.

However, when transformed, the transformed application 210 may include some additional data and executable code. For example, it may include a transformed user interface (UI) 216-1, transformed functional computing logic 216-2 and unchanged batch jobs 210-3. In addition, an application server 220 may be extended to an extended application server 225, and may include additional software frameworks for stateless consistency handling. In particular, the extended server 225 may include a consistency framework 226 that may include a stateless locking framework 225-1 and a stateless update task framework 225-2.

The UI 216-1 of the transformed application may be stateless, and may include additional functionality provided by additional code that provides state handling similar to the transformed application of FIG. 2A. In addition, the functional computing logic 216-2 of the transformed application 216 may include additional code for state handling similar to the transformed application of FIG. 2A.

The implementation of the consistency framework 226 within, for example, an application server implemented as the extended application server 225 may directly access the user Session ID generated by the UI framework (e.g. the BSP application framework). In addition, for batch jobs, the application server may either generate a unique ID or reuse an internal unique ID like a process ID, e.g. the user context ID in case of an ABAP application server, to identify each batch job. Hence, in each case the consistency framework 226 could access this ID. Therefore, the application server may be able to select an appropriate LUW_ID, required to call the consistency framework, based on the determination that the coding runs as a user interface task or background job automatically.

An LUW_ID, determined by the application server and required by the consistency framework, may be passed on internally within the application server 225, which is in this example, an ABAP server. As a consequence, further modifications to provide this functionality to the coding of the application 216, for example, the functional computing layer coding and the batch jobs of an ABAP application, may not be required. In other words, the following ABAP statements may be used without any changes to the original application coding: CALL FUNCTION . . . IN UPDATE TASK, PERFORM ON COMMIT, CALL FUNCTION . . . IN BACKGROUND TASK DESTINATION, COMMIT WORK, PERFORM ON COMMIT, PERFORM ON ROLLBACK, ROLLBACK, SET UPDATE TASK LOCAL, ENQUEUE, DEQUEUE and DEQUEUE_ALL.

The two consistency frameworks, stateless lock and update task framework, may be implemented similarly to the ones shown in FIG. 2A. The implementation of stateless lock and update task framework may use lock storage and update tasks storage, respectively.

Generally, a batch job to run the clean-up function cyclically is not required to remove data for abnormal terminated applications from the different storages in case the application server calls the clean up functionality directly when a session ends (either abnormally or regular). In case the application server itself aborts abnormally, it may terminate all running sessions abnormally, too. Hence, a clean-up function may to be called at startup of the server to remove information belonging to inactive sessions.

A general guideline for structuring the stateless application user context may include limiting the size of the state representation data to be smaller than the user context in the original stateful application (for example, 210 of FIG. 2A).

The efficiency of the state management (state storage and user context rebuild) may be optimized if the state is maintained with less data than the user context of the original application. As a result, the state representation may be maintained between requests (dialog steps).

Figure 3:
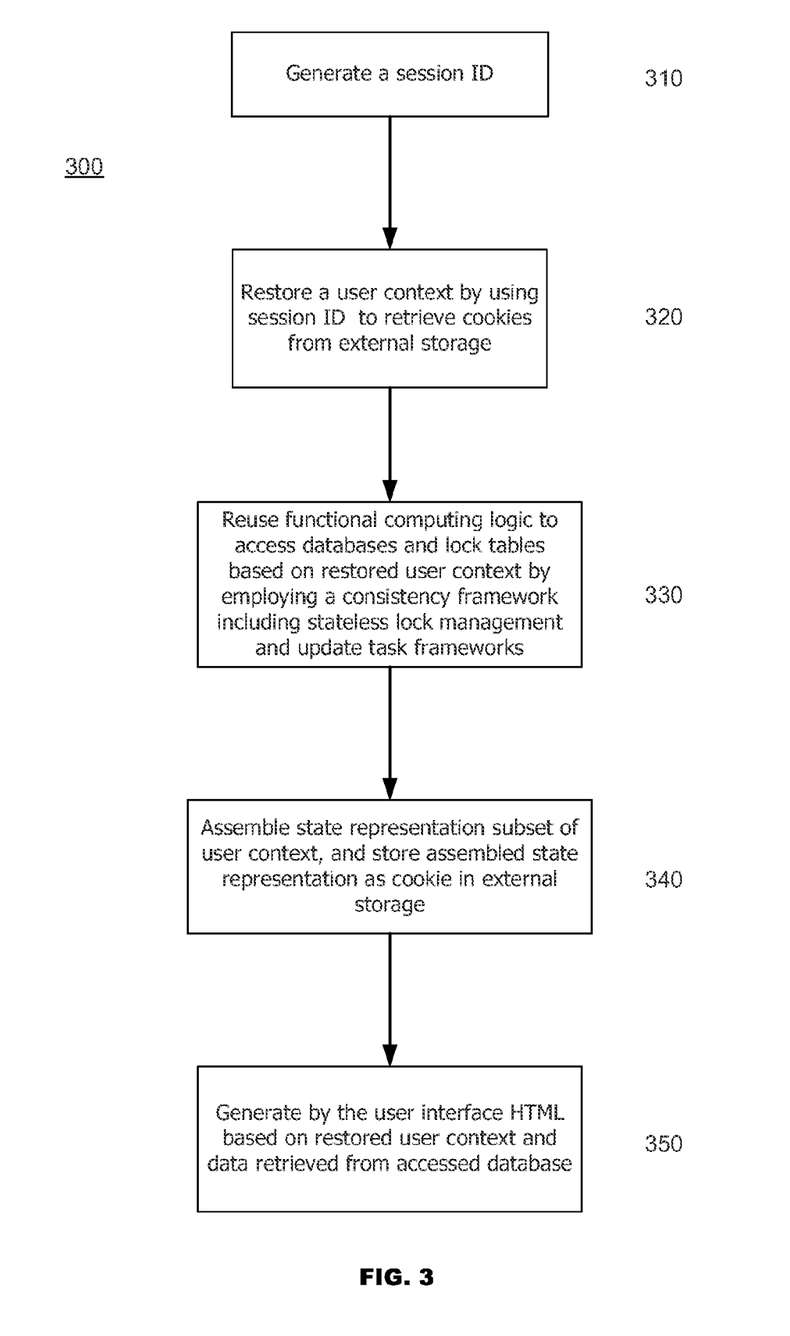
FIG. 3 illustrates an exemplary process in an application environment and a server environment for scaling a computer system to a large number of concurrent users according to an exemplary embodiment.

FIG. 3 illustrates an exemplary process for scaling a computer system to a large number of concurrent users. The process 300 begins in a stateful application in which, at step 310, a session identification (ID) may be generated for the user session. In the case where a large number of users may be accessing a computer application, for example, an accounting program for end of the month reconciliation, a session ID may be generated for each of the plurality of users of the computer application.

For example, the session ID may be generated by a business server page framework executing on an application server, and in combination with a UI layer as shown in FIG. 1. At step 320, a user context for each of the plurality of users may be restored by using the respective generated session ID to retrieve cookies from external storage. Using the restored user context, the functional computing logic may be called to provide, for example, requested functions to each of the plurality of users.

According to requests from a user interface and based on data, such as permissions and security settings, from the restored user context, the functional computing logic functions, at step 330, may access data in a database, may create/cancel update tasks and may set/reset locks by means of the consistency framework that may include stateless lock management and an update task framework. A state representation subset of a user context may be assembled at step 340. The user context and the assembled state representation may be stored as a cookie in external storage like the storage 112 of FIG. 1 or the database 431 of FIG. 4 using, for example, the session ID as a primary key. At step 350, HTML code may be generated by, for example, the user interface based on the assembled state representation, user context, and data from the accessed database.

The process 300 may also be applied to an application server embodiment in which as shown in FIG. 2A, the application server 225 may be extended to provide state handling and consistency handling without the application. The extended server 225 may implement the process steps indicated above that are explained as being handled by a computer application. In the case of a server implementation, only changes to state handling of the application coding may be necessary as all state and consistency handling functions are performed by a processor at the server. Accordingly, the above described stateless functionality may be provided to a number of different computer applications at the server level.

Figure 4:
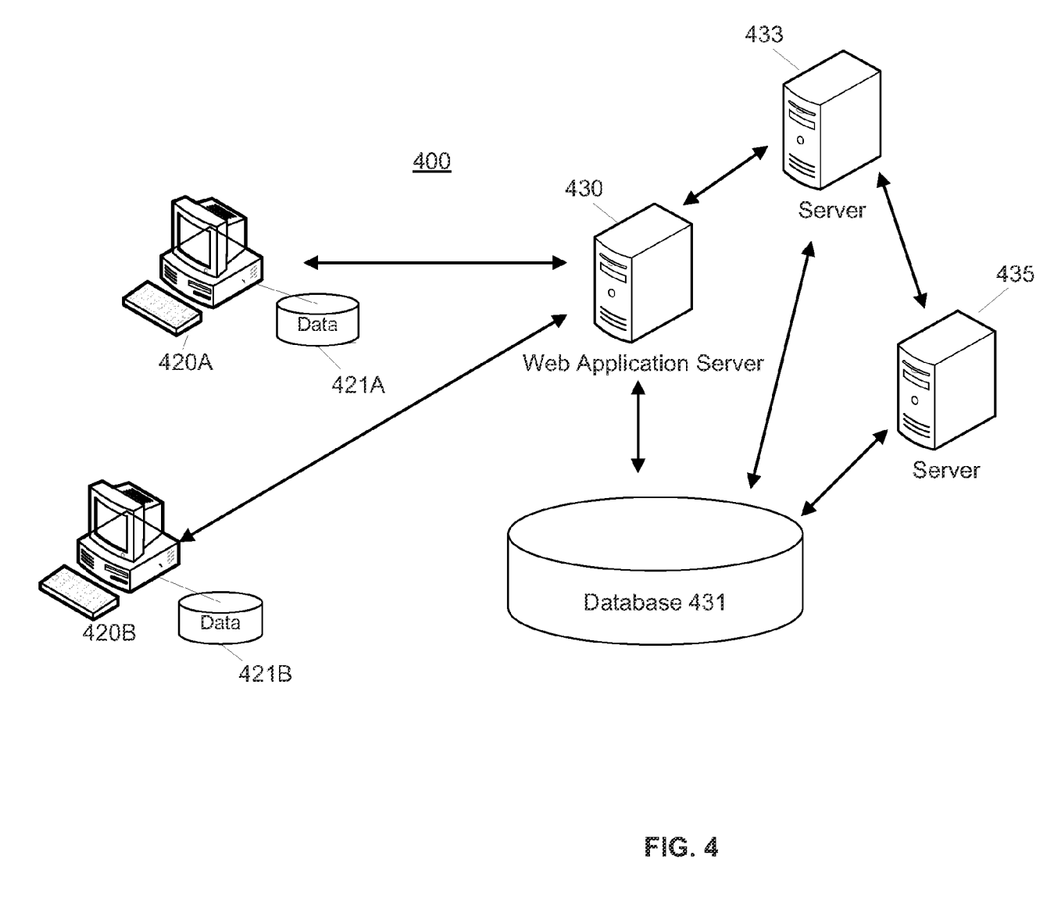
FIG. 4 illustrates a system diagram for implementing a process of scaling a computer system to a large number of concurrent users according to an exemplary embodiment.

An exemplary computer system for implementing a process as described with respect to FIG. 3 is illustrated in FIG. 4. The computer system 400 may comprise terminals 420A and 420B, a web application server 430 and a database 431. The terminals 420A and 420B may have access to respective data storage 421A and 421B. The terminals 420A and 420B may be simply display devices with input capabilities, e.g., keyboard, for presenting a graphical user interface and receiving input. Alternatively, terminals 420A and 420B may contain processors and execute functional computing logic, such as computer applications related to, for example, invoicing and human resources management.

Stateful computer application processes may execute on a processor of the web application server 430, which in this case is a stateful server, and a graphical user interface may render data for presentation on the client terminals 420A and 420B. Alternatively, the graphical user interface and related functionality may be present on the terminals 420A and 420B. The web application server 430 may be in communication with additional servers within a network such as servers 433 and 435. Either or both of the servers 433 and 435 may maintain the above-described lock server and message server, act as a database server or a web application server. Servers 433 and 435 may retrieve and store data in the database 431. The servers 433 and 435 may also be stateless servers running stateless applications to be called via the web application server 430. In all cases, the web application running on the server 430 acts as a stateless server, even though the internal processing is optimized with features of a stateless application.

The exemplary method and computer program instructions may be embodied on a machine readable storage medium such as a computer disc, optically-readable media, magnetic media, hard drives, RAID storage device, and flash memory. In addition, a server or a database server may include machine readable media configured to store machine executable program instructions. The features of the disclosed embodiments may be implemented in hardware, software, firmware, or a combination thereof and utilized in systems, subsystems, components or subcomponents thereof. When implemented in software, the elements of the disclosed embodiments are programs or the code segments used to perform the necessary tasks. The program or code segments can be stored on machine readable storage media. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the sprit and substantive features of the invention. For example, features and embodiments described above may be combined with and without each other. The present embodiments are therefore to be considered in all respects as illustrative and not restrictive.

What is claimed is:

1. A method for providing a stateful computer application to a multitude of users, the method comprising for a given user of the plurality of users:

generating a session identification for a user session for the user, wherein the state of the stateful computer application is described by a set of user-specific session variables;

retrieving a state representation related to the user from a storage using the session identification, wherein the state representation comprises information permitting to reconstruct the set of user-specific session variables;

restoring the set of user-specific session variables for the user by using the retrieved state representation;

calling functional computing logic based on the restored set of user-specific session variables, wherein the functional computing logic comprises the code of the stateful computer application, wherein the call provides an updated set of user-specific session variables;

calling of locking functions of the stateful computer application, wherein a stateless locking framework module substitutes the locking functions of the stateful computer application by substitute locking functions;

upon completion of functions performed by the called functional computing logic, assembling from the updated set of user-specific session variables an updated state representation for the user and storing the updated state representation in the storage, wherein the session identification is a primary key, wherein the updated state representation comprises information permitting to reconstruct the updated set of user-specific session variables.

2. The method of claim 1, wherein retrieving the state representation comprises retrieving a cookie related to the user from the storage using the session identification, wherein the state representation is comprised in the cookie.

3. The method of claim 1, wherein the stateful computer application is an application of a set of stateful computer applications, wherein the generation of the session identification is performed specific to the stateful computer applications of the set of stateful computer applications.

4. The method of claim 1, further comprising providing a result of the calling by a user interface to the user.

5. The method of claim 1, wherein the functions performed by the functional computing logic are performed by a stateful computer system.

6. The method of claim 1, wherein the session identification is generated by the stateful computer application and wherein the restoring of the set of user-specific session variables is performed by the stateful computer system.

7. The method of claim 1, further comprising transforming the stateful application into a transformed application by a recoding process, wherein the transformed application is able to perform the method.

8. The method of claim 5, wherein the functional computing logic comprises the code of the stateful computer application in an unmodified manner.

9. A method for providing a stateful computer application to a multitude of users, the method comprising for a given user of the plurality of users:

generating a session identification for a user session for the user, wherein the state of the stateful computer application is described by a set of user-specific session variables;

retrieving a state representation related to the user from a storage using the session identification, wherein the state representation comprises information permitting to reconstruct the set of user-specific session variables;

restoring the set of user-specific session variables for the user by using the retrieved state representation;

calling functional computing logic based on the restored set of user-specific session variables, wherein the functional computing logic comprises the code of the stateful computer application, wherein the call provides an updated set of user-specific session variables;

upon completion of functions performed by the called functional computing logic, assembling from the updated set of user-specific session variables an updated state representation for the user and storing the updated state representation in the storage, wherein the session identification is a primary key, wherein the updated state representation comprises information permitting to reconstruct the updated set of user-specific session variables wherein the functions performed by the functional computing logic are performed by a stateful computer system, wherein the functional computing logic comprises the code of the stateful computer application in an unmodified manner, and wherein the stateful computer system comprises a stateless locking framework module, wherein in case the calling of the functional computing logic comprises calling of locking functions of the stateful computer application, the stateless locking framework module substitutes the locking functions of the stateful computer application by substitute locking functions, wherein the substitute locking functions are adapted for providing database locks on data resources requested by the calling of the functional computing logic.

10. The method of claim 9, wherein the data resources are comprised in an application database.

11. The method of claim 10, wherein the database locks are stored in a lock storage database, wherein the database locks are stored associated with the session identification, the name of the computer running the stateful computer application and a timestamp as a compound primary key, wherein the timestamp comprises the point in time when the respective database lock was set.

12. The method of claim 11, wherein the stateful computer system comprises a stateless update task framework module, wherein the stateless update task framework module is queuing predetermined statements of the code of the stateful computer application, wherein the queued statements are executed upon reception of a predefined execution statement, wherein the queuing is performed in a database table, wherein the database table is maintainable over the whole user session.

13. The method of claim 12, wherein the stateful computer system comprises a clean-up job module, wherein the clean-up job module is removing the database locks on data resources previously set by the stateless locking framework module, wherein the removal of the database locks is performed after a timeout, wherein the timeout is determined for each database lock from a predetermined time period and the timestamp.

14. A non-transitory computer program product comprising computer executable instructions to perform the method steps as claimed in claim 1.

15. A computer system for providing a stateful computer application to a multitude of users, the system being adapted for performing the following steps for a given user of the plurality of users:

generating a session identification for a user session for the user, wherein the state of the stateful computer application is described by a set of user-specific session variables;

retrieving a state representation related to the user from a storage using the session identification, wherein the state representation comprises information permitting to reconstruct the set of user-specific session variables;

restoring the set of user-specific session variables for the user by using the retrieved state representation;

calling functional computing logic based on the restored set of user-specific session variables, wherein the functional computing logic comprises the code of the stateful computer application, wherein the call provides an updated set of user-specific session variables;

calling of locking functions of the stateful computer application, wherein a stateless locking framework module substitutes the locking functions of the stateful computer application by substitute locking functions;

upon completion of functions performed by the called functional computing logic, assembling from the updated set of user-specific session variables an updated state representation for the user and storing the updated state representation in the storage, wherein the session identification is a primary key, wherein the updated state representation comprises information permitting to reconstruct the updated set of user-specific session variables.

* * * * *